US009813004B2

(12) United States Patent
Shrestha et al.

(10) Patent No.: US 9,813,004 B2
(45) Date of Patent: Nov. 7, 2017

(54) SYSTEMS AND METHODS CONCERNING EXCITERLESS SYNCHRONOUS MACHINES

(71) Applicant: ABB Technology AG, Zurich (CH)

(72) Inventors: Ghanshyam Shrestha, Raleigh, NC (US); Darren Tremelling, Raleigh, NC (US); Waqas Arshad, Raleigh, NC (US); Wen Ouyang, Raleigh, NC (US); Jan Westerlund, Helsinki (FI)

(73) Assignee: ABB Schweiz AG, Baden (CH)

(*) Notice: Subject to any disclaimer, the term of this patent is extended or adjusted under 35 U.S.C. 154(b) by 35 days.

(21) Appl. No.: 14/598,926

(22) Filed: Jan. 16, 2015

(65) Prior Publication Data

US 2016/0211787 A1     Jul. 21, 2016

(51) Int. Cl.
H02P 9/30 (2006.01)
H02K 3/20 (2006.01)
H02K 3/28 (2006.01)
H02K 11/042 (2016.01)
H02K 19/12 (2006.01)

(52) U.S. Cl.
CPC ............. *H02P 9/302* (2013.01); *H02K 3/28* (2013.01); *H02K 11/042* (2013.01); *H02K 19/12* (2013.01); *H02K 3/20* (2013.01)

(58) Field of Classification Search
CPC ... H02P 9/305; H02P 2009/005; H02K 19/38; H02K 11/046; H02K 11/042; H02K 19/36
USPC .......................................... 322/59; 310/68 D
See application file for complete search history.

(56) References Cited

U.S. PATENT DOCUMENTS

| 2,333,538 A | 11/1943 | Liwschitz |
| 3,938,029 A | 2/1976 | Wagner et al. |
| 4,079,446 A | 3/1978 | Hertz |
| 6,051,953 A | 4/2000 | Vithayathil |
| 7,592,785 B2* | 9/2009 | Kimura ............... B60L 15/025 322/28 |
| 7,787,913 B2 | 8/2010 | Cornell |
| 7,982,326 B2* | 7/2011 | Tan ........................ H02P 9/42 290/44 |
| 2004/0199701 A1 | 10/2004 | Eckmuller |

(Continued)

FOREIGN PATENT DOCUMENTS

| EP | 2043255 A2 | 1/2009 |
| EP | 2728805 A2 | 7/2014 |

OTHER PUBLICATIONS

International Search Report and written opinion, PCT/US16/13826, ABB Technology AG, dated Apr. 1, 2016.

*Primary Examiner* — Tulsidas C Patel
*Assistant Examiner* — Charles Reid, Jr.
(74) *Attorney, Agent, or Firm* — Taft Stettinius & Hollister LLP

(57) ABSTRACT

A synchronous machine and related systems include a stator and rotor separated by an air gap. The rotor includes a rotating DC power supply coupled to exciter windings disposed adjacent the air gap. Power from air gap harmonics, including air gap slot harmonics induce current in the exciter windings, which is rectified and supplied to the rotor field windings. In operation, a desired current level in the rotor field windings can be achieved through control of the DC power supply or superposition of harmonics into the stator winding current which induces the prescribed current in exciter windings.

7 Claims, 6 Drawing Sheets

(56) References Cited

U.S. PATENT DOCUMENTS

| | | | |
|---|---|---|---|
| 2005/0146226 A1* | 7/2005 | Trainer | H02M 1/12 307/73 |
| 2008/0074910 A1 | 3/2008 | Casteel et al. | |
| 2009/0315329 A1 | 12/2009 | Duffey et al. | |
| 2011/0315496 A1* | 12/2011 | Bohori | B60L 5/005 191/10 |
| 2014/0029318 A1 | 1/2014 | Chen et al. | |
| 2015/0263526 A1* | 9/2015 | Kjær | H02J 3/386 290/44 |
| 2016/0013744 A1* | 1/2016 | McLean | H02K 19/34 290/8 |

* cited by examiner

SYSTEMS AND METHODS CONCERNING EXCITERLESS SYNCHRONOUS MACHINES

FIELD OF INVENTION

The present teachings concern synchronous machines having field windings requiring excitation. In particular, the present teachings concern synchronous motors and generators, including brushless machines requiring excitation of field windings.

BACKGROUND

Most brushless synchronous machines include two separate machines, the main machine and the exciter machine. The exciter machine provides excitation power to the field windings of the main machine. The stator of the exciter has electromagnet poles that are provided with power from a separate power stage in an automatic voltage regulator ("AVR"). By regulation of one or both of the voltage and frequency of the excitation on the stator of the exciter machine, the excitation of the main machine can be indirectly regulated. Such a power stage providing power to the excitation machine requires components such as transformers, breakers and active power electronics. In addition to the components required for the power stage, the exciter of a 20MVA class machine weighs about 2% of the total weight of the combined main machine and exciter machine, and can take up to 20% of the total length of the shaft of the combined machines. Thus, the total weight and size of the combined machines is greater than would otherwise be without an exciter and associated equipment required to operate the exciter. A longer shaft also reduces the critical speed of the rotor. Thus, it would be beneficial to be able to provide excitation to the main machine without the necessity of an exciter machine and associated power stage.

SUMMARY

A synchronous machine and related systems include a stator and rotor separated by an air gap. The rotor includes a rotating DC power supply coupled to exciter windings disposed adjacent the air gap. Power from air gap harmonics, including air gap slot harmonics induce current in the exciter windings, which is rectified and supplied to the rotor field windings. In operation, a desired current level in the rotor field windings can be achieved through control of the DC power supply or superposition of harmonics into the stator winding current which induces the prescribed current in exciter windings.

BRIEF DESCRIPTION OF THE DRAWINGS

In the accompanying drawings, structures and methods are illustrated that, together with the detailed description provided below, describe aspects of an exciterless synchronous machine, and systems and methods concerning thereof. It will be noted that a single component may be implemented as multiple components or that multiple components may be implemented as a single component. The figures are not drawn to scale and the proportions of certain parts have been exaggerated for convenience of illustration. Further, in the accompanying drawings and description that follow, like parts are indicated throughout the drawings and written description with the same reference numerals, respectively.

DETAILED DESCRIPTION

Figure 1:
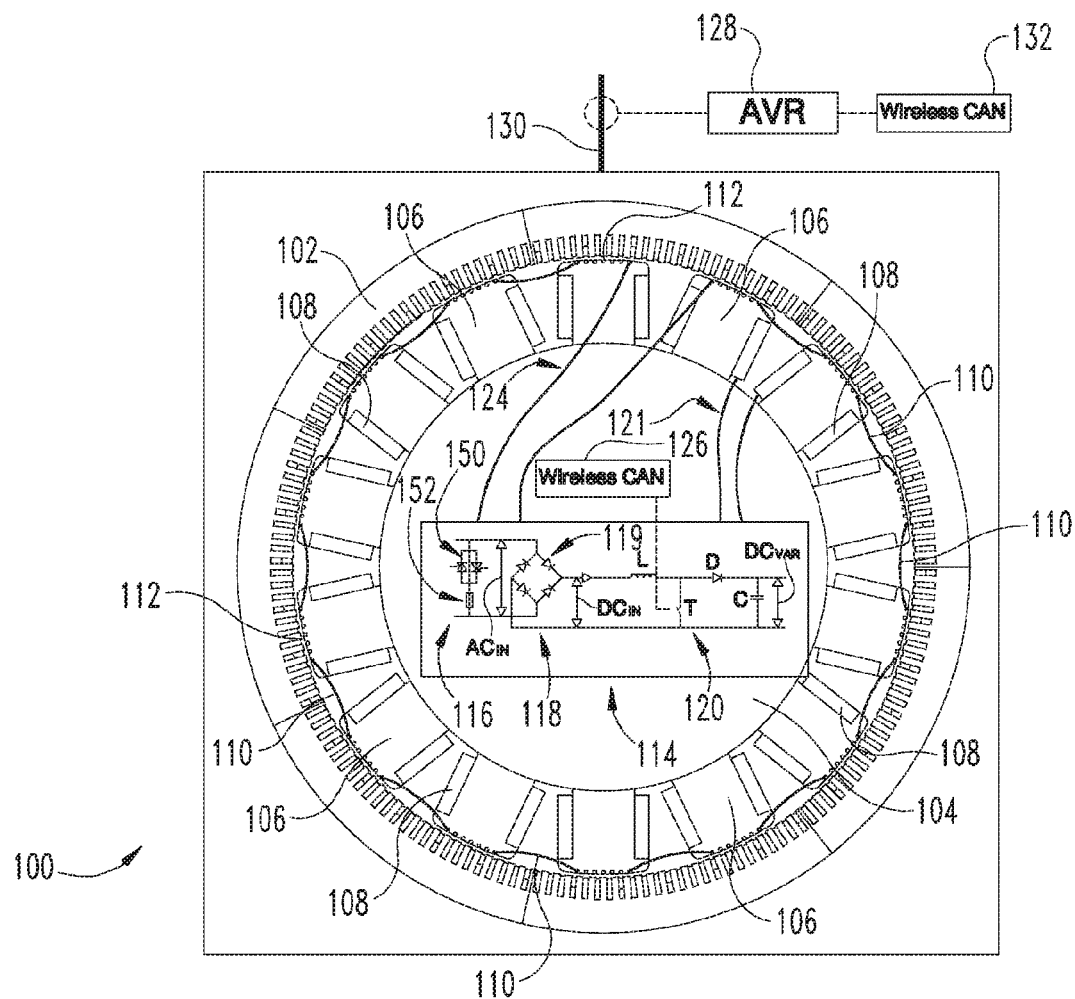
FIG. 1 illustrates a schematic view of an exciterless synchronous machine 100.

With reference to FIG. 1, an exciterless synchronous machine 100 according to the present teachings includes a stator 102 and a rotor 104. The rotor 104 includes poles 106, only one of which is shown for convenience of illustration. Pole 106 includes field windings 108, and exciter windings 110. The exciter windings 110 are disposed adjacent the air gap 112 of the synchronous machine 100. While the illustrated rotor 104 is an internal rotor 104, the present teachings can also be applied to external rotor 104 geometries.

The air gap 112 of a synchronous machine 100 contains significant flux content. The flux distribution in the air gap 112 of synchronous machine 100 can depend on several factors, including but not limited to space harmonics due to distribution of the windings, slotting, salient poles, time harmonics due to non-ideal currents in the stator windings and switching of power electronics devices when the stator windings are connected to a power electronic converter. The harmonic distribution present in the air gap 112 can also vary at different operation modes, including no, full or partial load conditions. Harmonics in an air gap 112 of an open slot type line fed synchronous machine mainly contain slotting harmonics due to the large slot openings in the stator 102. A Fourier expansion of the air gap magnetic flux density waveform shows that the slotting harmonics, which are the 24th order harmonics in the case of the machine 100 of FIG. 1, are very significant compared to the other harmonics present in the air gap 112 flux distribution during nominal operation. Similar results can be seen in the no load and short circuit cases. Further, a converter fed synchronous machine can contain low order harmonics in addition to slotting harmonics.

With continued reference to FIG. 1, the exciter windings 110 are disposed adjacent the air gap 112, where damper bars can typically be placed in brushed or brushless synchronous machines with separate exciter machines. However, the exciter winding 110 pitch can be optimized for maximum energy harvesting from the slotting harmonics. According to one aspect of the present teachings, damper bars are replaced by the exciter windings 110 in order to capture the electromotive force present due at least in part to the slotting harmonics in the air gap 112. One of the primary functions of traditional damper bars is to damp transients in synchronous motors. Such transients can cause "hunting" behavior by the synchronous machine and are undesirable. The exciter windings 110 can perform this and other functions performed by traditional damper bars, including mitigating against transients, assisting in motor starting, protection of the field winding, and reduction of transient or sub-transient reactances. Unlike damper bars, which can be shorted at the axial ends of the rotor 104, the exciter windings 110 are connected to additional components described herein that capture the current generated in the exciter windings 110 and provide that current to the field windings 108 of the rotor 104. It should be noted that traditional damper bars can be implemented in addition to the exciter windings 110, for example to maintain reactances at desired levels. Further, from one to all of the exciter windings 110 can be configured to selectively operate as traditional damper bars, for example by shorting one or more the exciter windings 100 and bypassing the voltage supply 114. For example, in an arrangement where the exciter windings 110 are arranged in a multi-pole configuration, one or more of the multiple poles of the exciter windings 110 can be shorted in such a way to behave as damper bars.

With continued reference to FIG. 1, the voltage in the exciter windings 110 can be fed to rotating voltage supply 114. Rotating voltage supply 114 can include an active damper 116, a rectifier 118, and a DC to DC converter 120. The active damper 116 receives $AC_{IN}$ through leads 124. Active damper 116 can include a triac 150 and a resistor 152 configured to disperse over-voltage conditions, for example during direct on-line starting of the machine. The example active damper 116 is illustrated without limitation, and active damper 116 can also include a variety of over voltage protection circuits and components. The rectifier 118 can be a multiphase passive rectifier including a full-wave diode bridge 119. Rectifier 118 converts $AC_{IN}$ to $DC_{IN}$. The slot harmonics have a higher frequency than the fundamental frequency of the machine, and so fast switching diodes are preferred over rectifiers based on conventional thyristors, which thyristors may not be ideal for such high frequencies. However, new high frequency switching thyristors could be implemented in voltage supply 114. Rectifier 118 includes four fast switching diodes in the full wave diode bridge 119. The depicted DC to DC converter 120 includes inductor L, switch T, diode D, and capacitor C arranged in a boost converter configuration. According to other aspects of the present teachings, the DC to DC converter 120 can be a buck converter, flyback converter or other form of DC to DC converter including DC to DC converters implementing active or passive components. The converter 120 receives $DC_{IN}$ from rectifier 118 and produces the variable DC output $DC_{VAR}$. The voltage supply 114 supplies $DC_{VAR}$ to the field windings 108 through leads 121. According to another aspect of the present teachings, voltage supply 114 can implement a thyristor rectifier to perform control of current in the field windings 108.

A wireless control area network (wireless CAN) transceiver 126 allows for the rotating voltage supply 114 to receive control signals from an automatic voltage regulator (AVR) 128. The AVR 128 is coupled to the stator leads 130, which can couple the stator 102 of the synchronous machine 100 to three phase AC. Through detection of the conditions at leads 130, the AVR 128 can determine the current required in the rotor windings 108 to generate the desired field in air gap 112. The AVR 128 can indirectly control the current of the rotor windings 108 by controlling the rotating supply 114 through wireless CAN transceiver 132, which communicates with transceiver 126, a combination of transmitter and receiver. It should be noted that the dual transmitter/receiver capability of transceivers 126 and 132 can be replaced with a transmitter and receiver pair, such that transceiver 126 is replaced with a receiver, and transceiver 132 is replaced with a transmitter, permitting one way communication of control signals. According to other aspects of the present teachings, the AVR can communicate with the rotating voltage supply through a variety of media, including through other wireless methods and "wired" methods such as brushes. Some suitable wireless forms of communication can include radio modulation techniques, optical communication, or through use capacitive or inductive communication techniques. According to one aspect of the present teachings, the rotating voltage supply 114 can be disposed close to the center of the rotor 104 to reduce rotational accelerations experienced by the supply 114, which can reach as high as 20 G under short circuit conditions. According to another aspect of the present teachings, a single supply 114 can be implemented, or multiple supplies 114 can be implemented, including but not limited to redundant backup supplies 114. Transceiver 126 controls the $DC_{VAR}$ through control of switch T of the boost converter.

Figure 2:
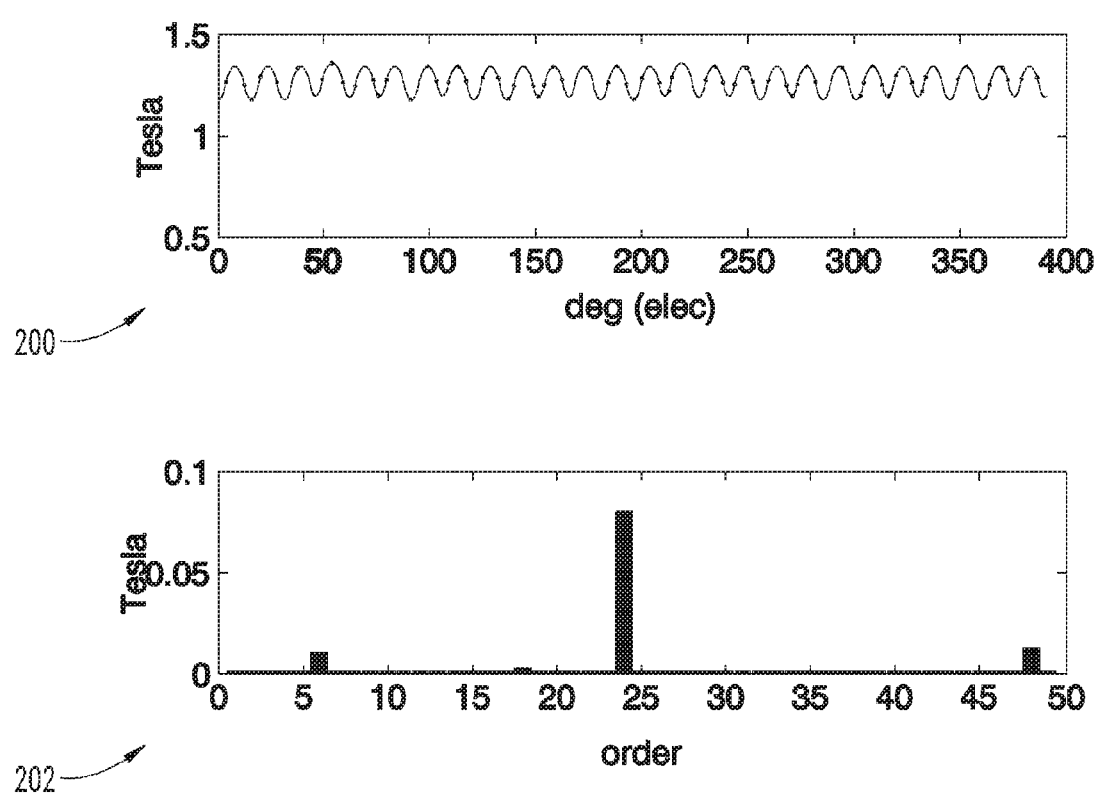
FIG. 2 illustrates charts 200, 202 showing magnetic field intensity over an electrical cycle of the synchronous machine and distribution of magnetic field contributions from harmonics for a modeled synchronous machine.

With reference to FIG. 2, the magnetic flux density in Tesla at the air gap of a modeled generator having the configuration of machine 100 shown in FIG. 1 under full load through a full electrical cycle in chart 200. In chart 202, the Fourier frequency spectrum distribution is shown for the flux near the air gap of the machine depicted in chart 200. As shown in chart 202, the slotting harmonics, which are the 24th order spatial harmonic in the machine shown in FIG. 1, is the most significant contributor of the harmonics, in particular for open slot machines. The phase belt harmonics, shown as a contribution at the 6th order harmonic in chart 202, are small compared to the slotting harmonics.

Figure 3:
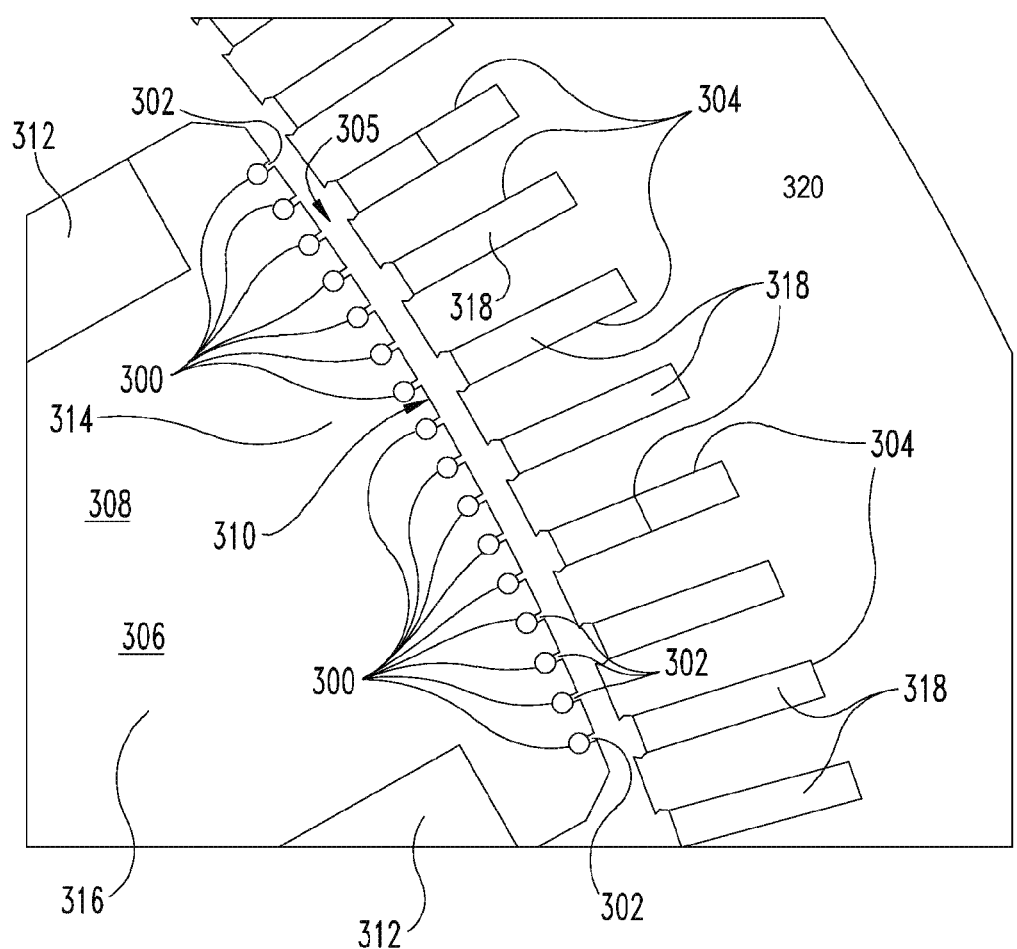
FIG. 3 illustrates a partial sectional view of a synchronous machine having exciter windings 300.

With reference to FIG. 3, a single phase harmonic exciter winding 300 is shown. According to one aspect of the present teachings, the number of winding slots 302 is about twice the number of stator slots 304 across the air gap 305 for a single phase harmonic exciter winding 300. The number of exciter windings can vary with the number of phases of exciter windings, the width and number of rotors, the size of the machine, and number of stator slots 304 or stator windings 318 in the stator. Without limitation, the number of rotor exciter winding slots 302 including an exciter winding 300 ($N_{rs}$) can be expressed using the following equation:

$$N_{rs} = k \cdot m \cdot \frac{b_{rp}}{2\pi r_{gap}} \cdot \frac{N_{ss}}{p}$$

Where k is an integer value, m is number of phases of exciter winding 300, $b_{rp}$ is the arc width of the rotor pole, $r_{gap}$ is the air gap radius of the machine, $N_{ss}$ is the number of slots in the stator and p is the number of rotor poles in the machine. The integer k can preferably be 1 or 2, but is not so limited and can take any suitable integer value permitted by the rotor and machine dimensions, such as 3, 4 or 5. According to one aspect of the present teachings, the number of rotor slots having exciter windings will be an integer number with the maximum value given by the above equation. According to another aspect, the number of exciter winding slots 302 can be about $N_{rs}$. Less number of rotor slots than can be used depending on the design requirement and the practical space limitation on the rotor surface. According to yet another aspect, the minimum number of winding slots 302 can be found by the lowest number of winding slots 302 having winding 300 that are operable to provide the field rating requirement of the machine. According to still another aspect, the number of winding slots 302 having winding 300 can take any integer value from the minimum number required to be capable of providing the field rating requirements of the machine up to about $N_{rs}$. According to yet another aspect, the number of exciter winding slots 302 can be an integer value of about a fraction of the value of $N_{rs}$, such as about $N_{rs}/10$, about $N_{rs}/5$, about $N_{rs}/4$, about $N_{rs}/3$, or about $N_{rs}/2$.

According to another aspect of the present teachings, the number of windings 300 will vary for multiphase operation. The number of windings 300 that can be placed will be limited by the saturation of the energy harvesting winding region, which has a consequence of significantly reducing the maximum energy harvested. The configuration for attaining the maximum amount of induced current in the exciter windings 300 from the slot harmonics can vary based on the distance between the windings 300, slot opening width, the air gap of the machine, the speed of the machine and type of power electronics converter implemented, and such aspects can be varied to generate the required amount of induced current in the exciter windings 300. According to another aspect of the present teachings, the plurality of exciter windings 300 are disposed within the pole 306 of the rotor 308 at the rotor edge 310 of the pole 306. According to still another aspect of the present teachings, the rotor 308 is a salient pole rotor, having field windings 312 disposed inwardly relative to pole transverse portion or pole "shoe" 314, and around the pole core 316. According to a further aspect of the present teachings, the rotor 308 and stator 320 depicted in FIG. 3 are for a 20MVA class generator. The exciter windings 300 can be disposed in slots 302 that are open. Slots 302 can be sized and shaped so to include only exciter windings 300 to the exclusion of other windings, including but not limited to the field windings 312, damper bars, or other auxiliary windings. Additional slots can be included on the rotor edge 310 that contain exciter windings 300 in addition to damper bars or other windings.

With continued reference to FIG. 3, the individual exciter windings 300 can be connected using a wave winding configuration, which in a single phase exciter winding 300 configuration can result in adjacent windings differing by 180 electrical degrees, such that the adjacent windings 300 carry current in antiparallel directions. It should be noted that other winding configurations can also be implemented according to the present teachings. For example, the number of turns can be varied in order to bring the voltage level near to the desired voltage. According to one aspect of the present teachings, the windings 300 are stranded, which can be desirable due to eddy current considerations. In one alternative example, traditional damper bars can be disposed in one or more of the slots 302 in combination with exciter windings 300.

The results of several generator tests demonstrate effectiveness of exciter windings, including but not limited to exciter windings 110 and 300 herein, in a broad range of applications. These tests included generators with and without coupled converters, and were performed using generators having a range of ratings and synchronous operating speed. In each case, sufficient power can be extracted from the exciter windings to power the field windings of the respective machine. Field power requirements for the machines were a small portion, about 1 percent, of the rating of the synchronous machines, and machines according to the present teachings can generate 200 percent of the field power required. Various factors affect the amount of power that can be extracted from exciter windings such as windings 110 and 300. The characteristics of the air gap of the machine, slot opening of the machine, frequency of the machine and the type of converters are some factors that can affect the amount of power required and extracted. The power extraction from the exciter windings can depend on the impedance of the exciter winding and load.

Figure 4:
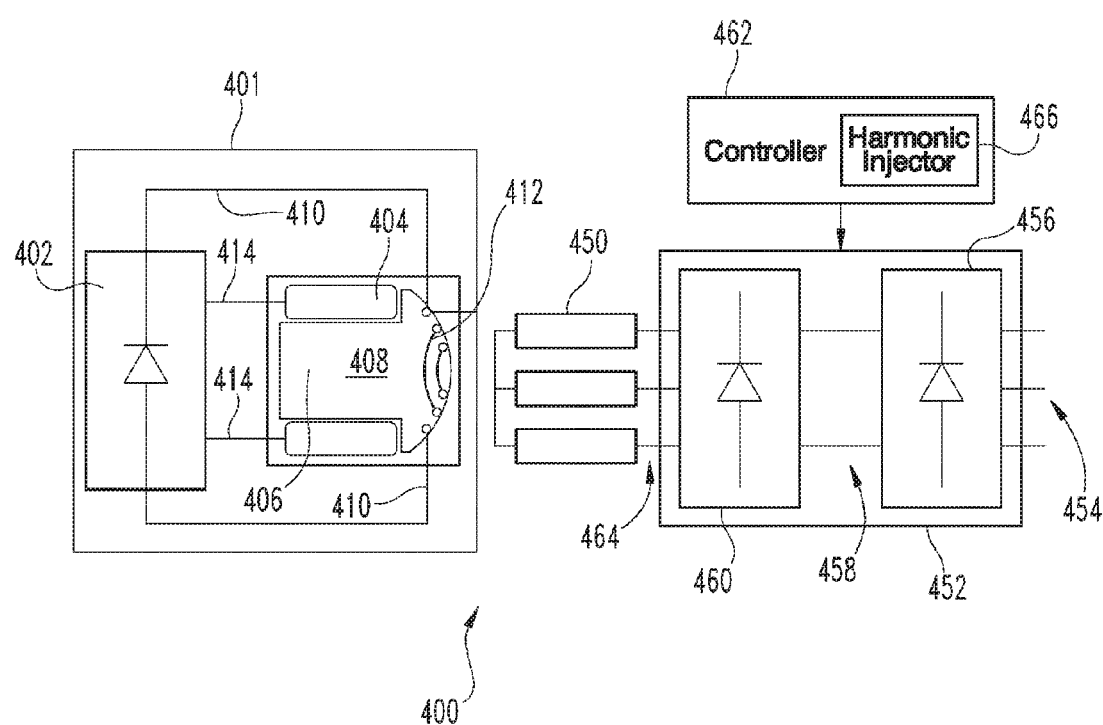
FIG. 4 illustrates a schematic view of synchronous machine 400.

With reference to FIG. 4, another aspect of the present teachings includes a passive rotor 401 of a machine 400 that can be beneficial for variable speed machines. Rotor 401 does not include any active or controlled electronic components, but rather includes a rotating passive rectifier 402. The rectifier 402 serves as a supply of excitation energy to the rotor field windings 404 surrounding the core 406 of salient pole 408. The rectifier 402 can be a full wave bridge diode rectifier, although other forms of rectifiers are also suitable. The rectifier 402 input terminals 410 receive the induced current developed in exciter windings 412. The output terminals 414 are coupled to the rotor field windings 404 and provide DC current to the windings 404. The field windings 404 serve as the load for the rectifier 402.

The stator winding 450 is electrically coupled to the grid through converter 452. Converter 452 receives three phase power across terminals 454. Rectifier 456, which can be an SCR-based rectifier, provides DC voltage across terminals 458 to inverter 460, which can be an SCR-based inverter. The converter 452 is controlled by controller 462, which can include components of a computing device including but not limited to a processor, memory, communication interfaces, and user interfaces among other components. Converter can also include a harmonic injector module 466. The harmonic injector module 466 can be software based, hardware based, or incorporate software and hardware, which during operation in the case of hardware or execution in the case of software can selectively introduce arbitrary harmonics into the converter voltage output by selectively operating converter to introduce harmonics into the supply. Such harmonics can be introduced, for example, by pulse controlled switching of converter 452 by the controller 462. Such controlled switching can be implemented through an SCR-based inverter, such that the output of the converter 452 includes one or both of prescribed spatial or temporal harmonics. The introduced harmonics are applied to stator winding 450 through leads 464, which supply the stator winding 450 with AC supply suitable for the respective application of the machine 400. Selective introduction of harmonics by controller 462 can deterministically affect the induced current in the exciter windings 412. According to one aspect of the present teachings, harmonics are introduced having spatial frequency of slot harmonics of the machine 400. By introducing such harmonics, the current induced in exciter windings 412 can be increased as necessary. Controller 462 can also be in communication with a voltage regulator, such as regulator 128. According to another aspect of the present teachings, controller 462 can be integrated into an AVR such as regulator 128. According to still another aspect of the present teachings, the harmonic injector module 466 can be configured to supply only fixed harmonics, which can be selected to match the slot harmonics for the particular machine 400. The configuration of machine 400 can be applied to both motors and generators. For larger machines where the converter frequency is limited, other lower order time harmonics than the slotting harmonics, such as fifth and seventh order time harmonics, are preferred for injection.

Figure 5:
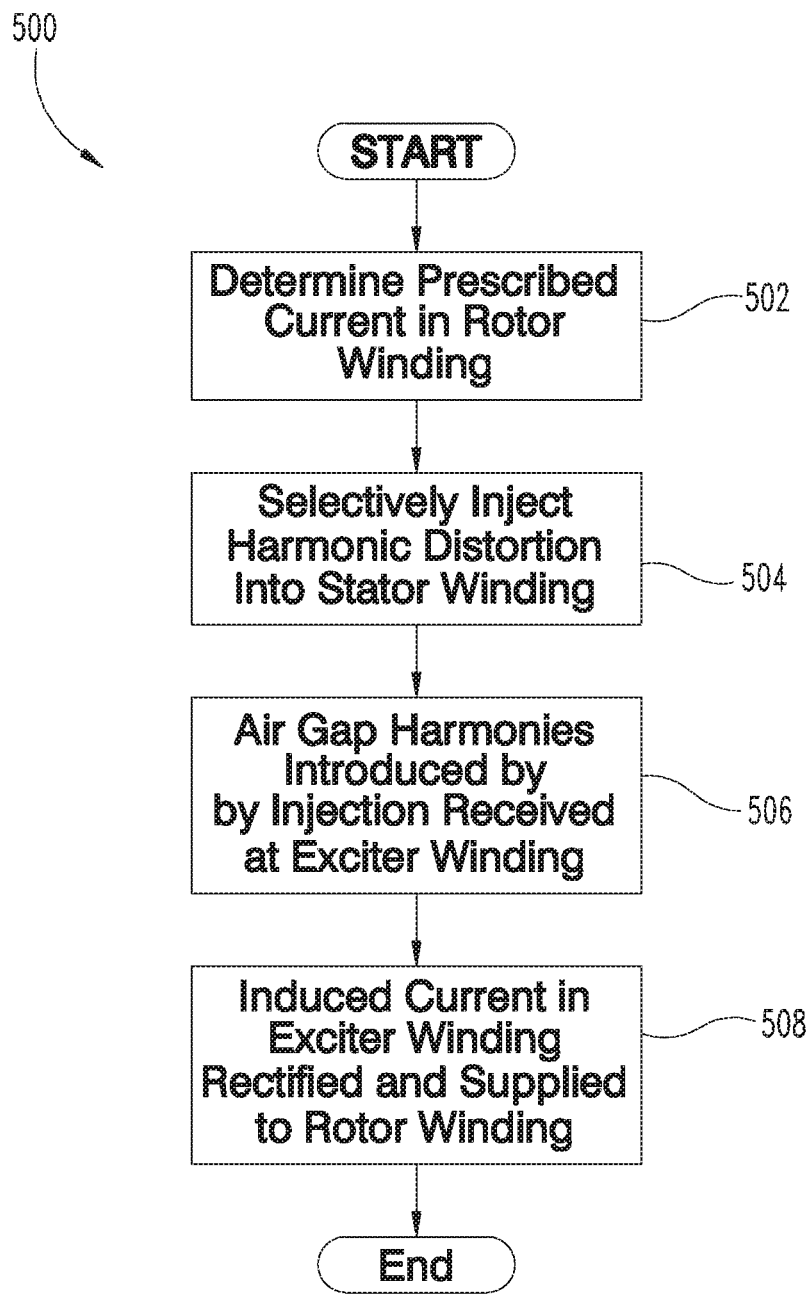
FIG. 5 illustrates a process 500 for operating a synchronous machine.

With reference to FIG. 5, a process 500 for operating a synchronous machine 400 includes determining a prescribed current level in the rotor field windings 404 in step 502. This determination can be done directly as by determining the amount of amperage itself, or indirectly, as by determining another electrical measurable such as voltage or power which have a deterministic relationship with the current in the windings 404. In step 504, based on the prescribe current level of the field winding 404 determined in step 502, harmonic distortion is selectively injected, for example with a controller including a harmonic injector module, at a frequency or frequencies that vary contribution of the slot frequency to the overall air gap field. The harmonics can be temporal harmonics or spatial harmonics. The amount of harmonics can be varied by either changing the amplitude or changing the phase angle of the injected harmonics. In step 506, air gap harmonics introduced by the selectively injected harmonics are received at the exciter windings 412. In step 508, the current induced in the exciter windings 412, including current attributable to the injection is rectified and supplied to the rotor windings 404, thereby effecting the prescribed current in the rotor.

Figure 6:
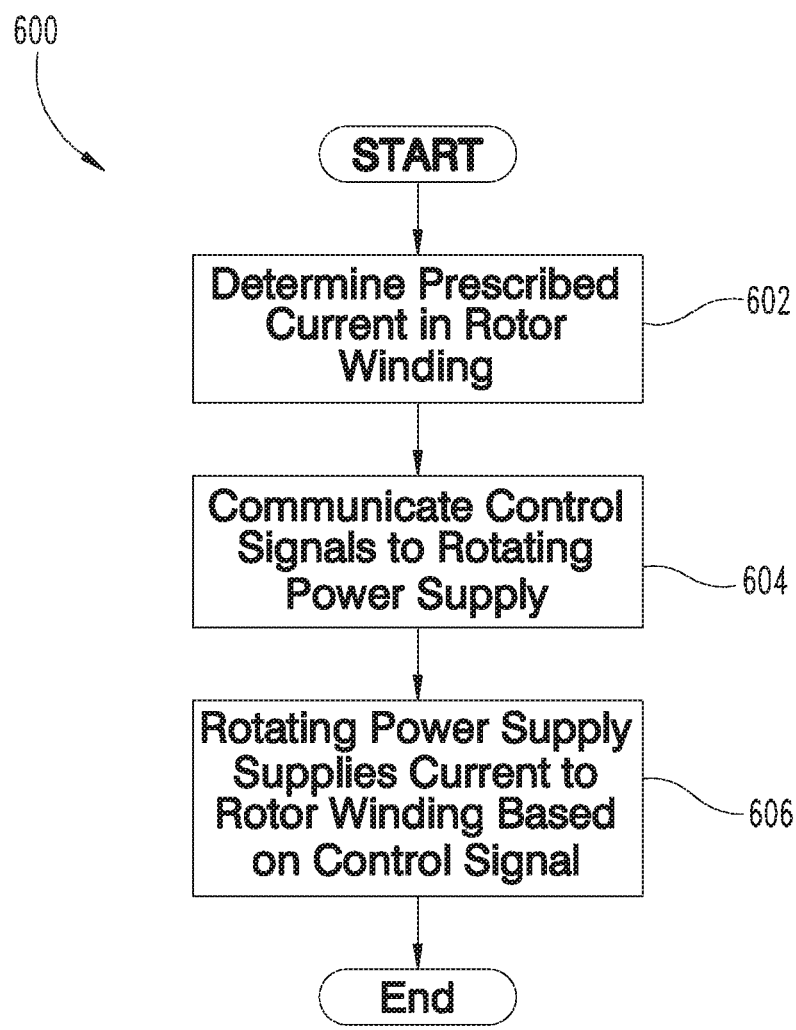
FIG. 6 illustrates a process 600 for operating a synchronous machine.

With reference to FIG. 6, a process 600 for operating synchronous machine 100 includes determining a prescribed current in the rotor field windings 108 in step 602. In step 604, based on the prescribed current of the field winding 404, a control signal is sent from the AVR 128 to the rotating power supply 114 via the Wireless CAN transceivers 126, 130. In step 606, the rotating power supply 114 supplies current to the rotor windings 108 based on the received control signals.

Exciterless synchronous machines such as machines 100 and 400 can be implemented in synchronous motors and generators and without a separate exciter machine. Such exciterless machines are more compact synchronous machines due to the lack of separate excitation system, which can enjoy application in a wide range of fields, including but not limited to in marine propulsion motors, synchronous generators, mining motors and wind turbine generators, of both low voltage (LV) and medium voltage (MV) generators.

In the present disclosure, reference numerals followed by alphabetic indices refer to one of the illustrated elements, while use of the reference numeral without the alphabetic indices refer to one or more of the illustrated elements. For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about A to B is intended to mean from about A to about B, where A and B are the specified values.

The description of various embodiments and the details of those embodiments is illustrative and is not intended to restrict or in any way limit the scope of the claimed invention to those embodiments and details. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention.

The invention claimed is:

1. A system for operating a synchronous machine, comprising:

a first surface of the rotor and second surface of the stator separated by an air gap, the rotor including a field winding, a rotating DC power supply and an exciter winding disposed in the first surface of the rotor adjacent the air gap, the exciter winding electrically coupled to an input of the DC power supply and the field winding coupled to an output of the DC power supply; and a converter electrically coupled to the stator, structured to transfer AC power including a fundamental frequency component between the converter and the stator, and including a harmonic injector, wherein the harmonic injector is configured to determine a harmonic component based on a prescribed current level of the field winding, wherein the harmonic injector is configured to selectively control the converter so as to add the harmonic component to the AC power transferred between the converter and the stator, wherein the exciter winding is structured to receive the harmonic component of the AC power, and wherein the DC power supply is structured to receive the harmonic component from the exciter winding, convert the harmonic component to DC power, and transmit the DC power to the field winding.

2. The system of claim 1, wherein the DC power supply is a passive DC power supply.

3. The system of claim 1, wherein converter includes a rectifier having an input electrically coupled to a multi-phase supply and an output coupled to an inverter, the harmonic injector electrically coupled to the inverter and configured to selectively supply one or both of temporal and spatial harmonics to the inverter.

4. A method for operating a synchronous machine, comprising:

selecting a prescribed current level in a rotor winding of the synchronous machine;

determining a harmonic distortion based on the prescribed current level, the harmonic distortion including a harmonic frequency;

injecting the harmonic distortion to the stator winding of the synchronous machine so as to transfer AC power to the stator winding including a fundamental frequency component and the harmonic distortion, inducing current attributable to the harmonic distortion in an exciter winding disposed in a surface of the rotor adjacent an air gap of the machine;

rectifying current in the exciter winding; and, supplying the rectified current to rotor windings of the rotor, thereby effecting the prescribed current level in the rotor winding.

5. The method of claim 4, wherein the selecting step includes selecting one or more of a voltage level or power level corresponding to a prescribed current level.

6. A method for operating a synchronous machine, comprising:

selecting a prescribed current level in a rotor winding of the synchronous machine based at least in part on electrical conditions in stator windings of the machine;

calculating a harmonic component based on the prescribed current level;

operating a converter including a harmonic injector so as to output AC power including a fundamental frequency component and the harmonic component;

transferring the AC power from the converter to the stator windings;

receiving the harmonic frequency component of the AC power with exciter windings disposed in an outer surface of a rotor adjacent an air gap of the machine;

communicating a wireless control signal from the converter to a rotating DC power supply in the rotor, the control signal corresponding to the prescribed current level;

rectifying current in the exciter windings; and supplying the current to the rotor winding based on the control signal.

7. The method of claim 6, wherein the communicating step includes communicating a control signal from a transmitter electrically coupled to an automatic voltage regulator to a receiver coupled to the DC power supply.

* * * * *